No. 830,543.
PATENTED SEPT. 11, 1906.
E. N. TRUMP & J. B. LADD.
MEASURING AND MIXING DEVICE.
APPLICATION FILED JAN. 28, 1905.
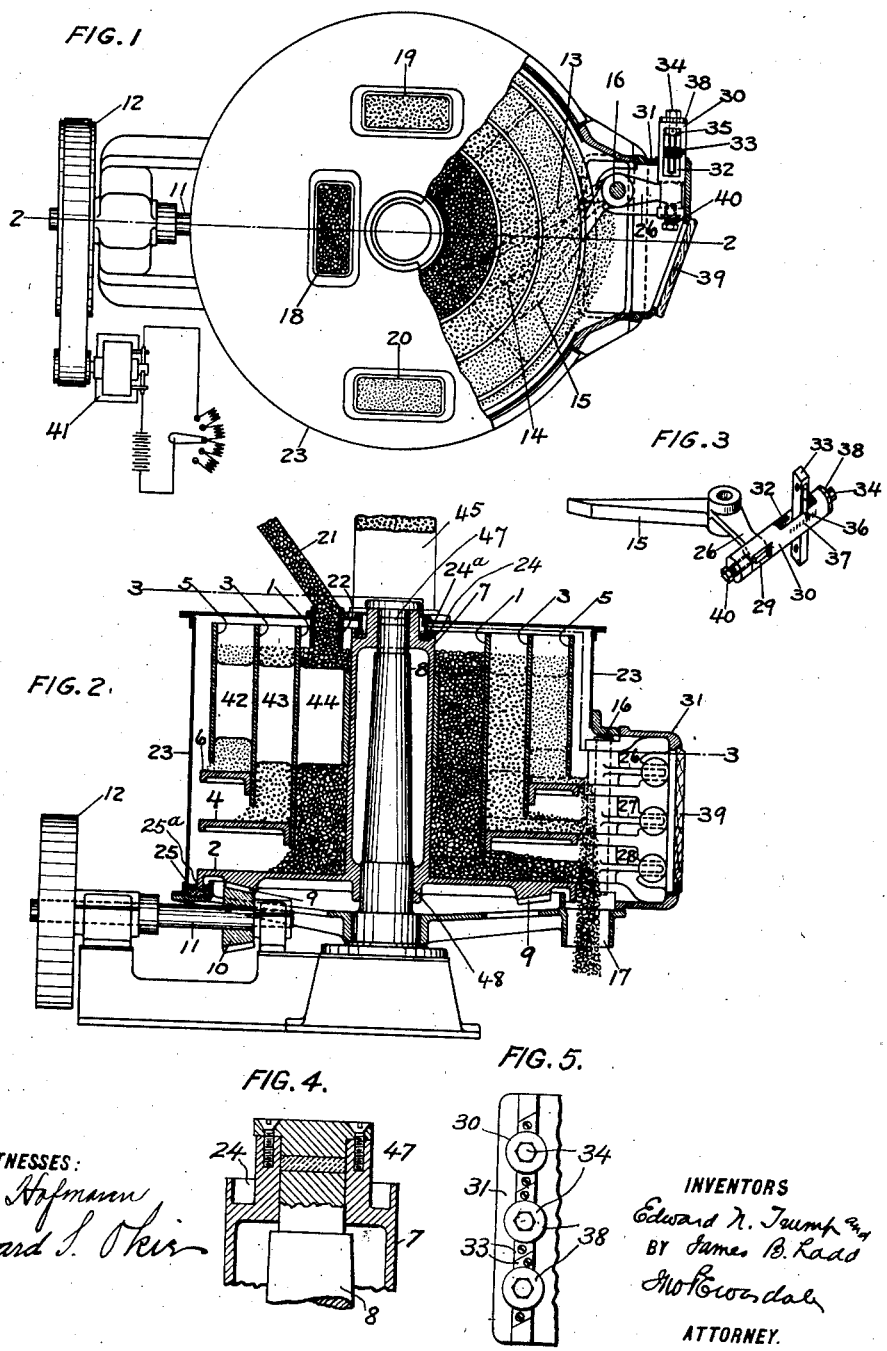
WITNESSES:
Mae Hofmann
Howard S. Okir
INVENTORS
Edward N. Trump and
BY James B. Ladd
Jno Crowdale
ATTORNEY.

UNITED STATES PATENT OFFICE.

EDWARD N. TRUMP, OF SYRACUSE, NEW YORK, AND JAMES B. LADD, OF WAYNE, PENNSYLVANIA; SAID LADD ASSIGNOR TO SAID TRUMP.

MEASURING AND MIXING DEVICE.

No. 830,543.  Specification of Letters Patent.  Patented Sept. 11, 1906.

Application filed January 28, 1905. Serial No. 243,011.

*To all whom it may concern:*

Be it known that we, EDWARD N. TRUMP, a resident of Syracuse, Onondaga county, State of New York, and JAMES B. LADD, a resident of Wayne, Delaware county, State of Pennsylvania, citizens of the United States, have invented a new and useful Measuring and Mixing Device, of which the following is a specification.

Our invention relates to improvements in means for feeding a plurality of materials, and especially for the feeding, measuring, and mixing of two or more materials in certain required relative rates or proportions.

Our invention comprises a plurality of rotatable receptacles, each formed with an upwardly-extending envelop and a platform or table spaced below the lower extension thereof. Into the space between the envelop and the platform of each receptacle projects an adjustable deflector adapted to encounter the material rotated thereby. By the proper proportioning and adjusting of these respective deflectors and also by the proper regulation of the speed of rotation of the receptacles the required feed from each receptacle, respectively, to any desired point may be secured.

Our invention also comprises means for deflecting the several materials so that the same shall fall together one upon the other, and thereby become thoroughly mixed and commingled in the falling.

Our invention also comprises improved means for the independent and accurate adjustment of the deflectors, each provided with a micrometer scale and pointer to indicate the amount of adjustment.

Our invention also comprises improved means for supplying materials to the several receptacles.

Our invention also comprises improved means for inclosing the several rotating masses with an approximately dustproof movable seal.

Our improved means is especially adapted for measuring and mixing cement, sand, and stone for concrete, for measuring and mixing various chemicals, for measuring and mixing dry colors, for feeding cement materials and coal to rotary kilns in such regular manner as to prevent the formation of rings in the kilns, for measuring and mixing lime, sand, and plasters, for blending coffees, and for measuring and mixing flours, sugar, &c., in bakery and confectionery establishments. In fact, our improved means is applicable for use in various industries in which materials are handled in bulk.

We accomplish our object by the mechanism illustrated in the accompanying drawings, in which—

Figure 1 is a plan view of our device in part section on line 3 3 of Fig. 2. Fig. 2 is a vertical section on line 2 2 of Fig. 1, with the exception of the pulley and shaft shown in elevation. Fig. 3 is a detail in perspective of a deflector and adjustable means therefor. Fig. 4 is a sectional detail, on an enlarged scale, of the step-bearing. Fig. 5 is an elevation, on an enlarged scale, of a portion of the casing with the deflector-adjusting mechanism.

Similar numerals refer to similar parts throughout the several views.

In the device illustrated in the drawings we have provided three receptacles—one composed of the cylinder 1 and platform 2, the second composed of cylinder 3 and platform 4, and the third composed of cylinder 5 and platform 6. Each cylinder is spaced a short distance above its respective platform, and each platform has a horizontal extension beyond the periphery of its respective cylinder sufficient to support any spread of the material beneath the lower edge of the cylinder due to natural slope. These cylinders are all secured together by radial arms, such as 42 and 43, (see Fig. 2,) and supported by a central sleeve 7, which is connected with the inner cylinder 1 by radial arms, such as 44. The central sleeve 7 has a step-bearing at 47 on the top of stationary post 8, provided, preferably, with hard bronze and steel washers and proper oiling means. (Not shown.) Said sleeve 7 also has a journal-bearing at 48 about the lower extension of post 8. The lower table or platform 2 is provided on its under side with a beveled gear 9, driven by the pinion 10 on counter-shaft 11, the counter-shaft 11 being driven by the pulley 12 from any suitable source of power, such as the rheostat-controlled motor 41. It will thus be seen that all three receptacles have a simultaneous rotation about a common axis.

The deflectors 13, 14, and 15 are pivotally mounted on the vertical post 16 and extend over the tables 2, 4, and 6, respectively, and beneath the lower extensions of the cylinders 1, 3, and 5, so as to encounter and deflect from each receptacle the under portion of the material rotated thereby. The platforms or tables are all of uniform diameters and the deflectors are so positioned as to deflect the material from the rotating tables at points approximately in vertical alinement with the aperture or conductor 17 delivering into any suitable receptacle. (Not shown.) By this means the material deflected from cylinder 5 will fall into and commingle with the material deflected from cylinder 3, while said commingled materials will in turn fall into and be commingled with the material deflected from cylinder 1, so that the three materials will fall through aperture 17 in a thoroughly mixed and commingled state. Any desired order of mixing of said materials may be readily secured by this mechanism—that is to say, since the material from 5 is first mixed with the material from 3 and that mixture is then mixed with the material from 1, it is obvious that the desired order of mixing the different materials is secured by the proper distribution of the respective materials to the receptacles.

The several receptacles are each connected through openings 18, 19, and 20, respectively, by chutes such as 21 and 45 (shown in Fig. 2) with storage-bins or other suitable sources of supply. By this means the material is delivered to the receptacles by gravity. By providing the respective openings with conductors such as 22, (shown in Fig. 2,) extending downwardly into the cylinders a short distance, it will be obvious that the material will be fed therethrough into the cylinders until the same are filled to the lower margins of said conductors 22, as shown in Fig. 2, whereupon the supply of material to each cylinder will be automatically stopped. In other words, the supply of material to the various receptacles will be automatically controlled so that said receptacles will always be maintained filled to the same level. This serves not only to automatically maintain an ample supply of material in the receptacle, but also serves to provide a supply of material sufficient to tide over any slight stoppage of the flow of material from the bins. The said cylinders and platforms are preferably inclosed in the casing 23. Between the fixed casing 23 and the movable receptacles are provided the coöperating channel 24 and projection 24ª and the coöperating channel 25 and projection 25ª. These channels are adapted to hold dust, sand, or other material to form a substantially air-tight and dustproof movable packing or seal between the said movable parts and the stationary casing 23.

The deflectors 13, 14, and 15 are supported by and adapted to rotate upon the post 16, which is secured to the stationary casing 23 or framework connected therewith. The adjustment of these deflectors all being similar the description of the means of adjustment of one will be sufficient for all.

Referring to Fig. 3, the deflector 15 is provided with the extension 26, which is adapted to project into the opening or aperture 29 of sleeve member 30. Member 30 is adapted to reciprocate through an aperture in box 31, secured to casing 23. Member 30 is also provided with a slot 32, through which projects the stationary bar 33, which is also secured to the box 31. The adjusting screw or bolt 34 projects through the end of member 30 and has a threaded coöperation with bar 33. This adjusting-screw 34 is provided with a collar 35, pinned thereto within the slot 32, so that by turning the screw in either direction the member 30 is made to move inwardly or outwardly with respect to the stationary casing, thereby changing the angular position of the deflector 15. The set-screw 40 is provided for securing the preliminary adjustment of extension 26 in opening 29. The bar 33 is provided with the pointer 36, which is adapted to traverse the scale 37 on member 30 as said member is moved in either direction. The adjusting screw or bolt 34 is provided with the plate or head 38, having peripheral graduations therein adapted to be read with respect to a fixed point marked on member 30 to indicate the fraction of rotation of said adjusting-screw 34, so that an extremely minute and accurate scale of the varying positions of member 30, and consequently of deflector 15, is secured. The box 31, which is secured to casing 23, incloses the adjusting mechanism above described. A door 39 may be provided in said box for obtaining access to the interior thereof.

What we claim is—

1. In a feeding device, the combination of a plurality of rotatable receptacles for material, each receptacle comprising a cylinder and a table spaced beneath its lower edge, said cylinders being arranged concentrically, said tables being of uniform diameter and each table having a diameter exceeding that of its respective cylinder sufficient to support the material at natural slope, and means for deflecting material from beneath the lower extension of each cylinder.

2. The combination of a rotatable cylinder a platform spaced beneath its lower extension and rotatable therewith, means for rotating the cylinder and platform, means for deflecting material from the platform from beneath the cylinder, a chute for delivering material to the cylinder and a conductor extending from the chute downwardly a short distance in said cylinder for maintaining the supply of material in the cylinder at an approximately constant height.

3. The combination of means for rotating a mass of material, means for deflecting material from the base of said rotating mass and means for adjusting the deflecting means, comprising reciprocative sleeve having operative relationship with said deflecting means, and an adjusting-screw for operating said sleeve.

4. The combination of means for rotating a mass of material, means for deflecting material from the base of said rotating mass, means for adjusting the deflecting means, comprising a reciprocative sleeve having operative relationship with said deflecting means and an adjusting-screw for operating said sleeve, a scale upon said sleeve for indicating the movement thereof, and a further micrometer-head for indicating the fraction of rotation of the adjusting-screw.

5. The combination of means for rotating a mass of material, means for deflecting material from the base of said rotating mass, means for adjusting the deflecting means, comprising a reciprocative sleeve having operative relationship with said deflecting means, an adjusting-screw for operating said sleeve, and a box for inclosing all of the adjusting mechanism except the end of the reciprocating sleeve and adjusting-screw.

6. The combination of means for rotating a mass of material, means for deflecting material from the base thereof, means for adjusting the deflecting means, comprising a reciprocative sleeve having operative relationship with said deflecting means and an adjusting-screw for operating said sleeve, a scale upon said sleeve for indicating the movement thereof, a further micrometer-head for indicating the fraction of rotation of the adjusting-screw, and a box for inclosing all of the adjusting mechanism except the end of the reciprocating sleeve and micrometer-head.

7. The combination of a rotatable receptacle comprising a cylinder and a platform spaced below its lower extension, a deflector adapted to project beneath the cylinder and sweep the table, a stationary casing for inclosing the rotatable receptacle, and channel and projection means for providing a movable seal between the rotatable receptacle and the stationary casing.

8. The combination of a plurality of concentric receptacles, each receptacle comprising a cylinder and a platform spaced below its lower extension, a deflector for each receptacle adapted to project beneath the cylinder and sweep the table, a stationary casing for inclosing said receptacle and deflectors and channel and projection means for providing movable seals between the stationary and movable parts.

9. The combination of a plurality of concentric receptacles, each comprising a cylinder and a platform spaced below its lower extension, the platforms all being of uniform diameter, and adjustably-supported means for deflecting from each receptacle the under portion of the mass of material rotated thereby.

10. The combination of a plurality of concentric receptacles, each comprising a cylinder and a platform spaced below its lower extension, the platforms all being of uniform diameter and adjustable means for deflecting at points in substantially vertical alinement from each receptacle the under portion of the mass of material rotated thereby.

11. The combination of a plurality of rotatable cylinders, each cylinder provided with a horizontal platform spaced below its lower extension, the platforms having a common diameter and a common axis of rotation, and means for deflecting from beneath each cylinder material rotated thereby.

12. The combination of a plurality of receptacles, each receptacle comprising a cylinder and a platform spaced below its lower extension, means for rotating said receptacles, adjustable means for deflecting material from each receptacle, conducting means for supplying material to each receptacle, and automatic means for controlling the flow therethrough to maintain the material at a constant height in said receptacles.

13. The combination of a stationary post, a plurality of receptacles, each receptacle comprising a cylinder and a platform spaced below its lower extension, said receptacles being supported upon a centrally-located sleeve, having a step-bearing upon the top of said post, means for rotating said receptacles and means for deflecting materials therefrom.

14. The combination of a stationary post, a plurality of receptacles, each receptacle comprising a cylinder and a platform spaced below its lower extension, said receptacles being supported upon a centrally-located sleeve, having a step-bearing upon the top of said post and a journal-bearing about the lower extension thereof, means for rotating said receptacles and means for deflecting materials therefrom.

EDWARD N. TRUMP.
JAMES B. LADD.

Witnesses as to Edward N. Trump:
HARLOW C. EHLE,
WILLARD M. HALL.

Witnesses as to James B. Ladd:
LOUISE B. MORRIS,
MERTON W. MORGAN.